May 28, 1968 L. M. FORBUSH 3,385,256
VEHICLE BRAKE LINING WEAR INDICATING DEVICES
Filed Feb. 28, 1967 2 Sheets-Sheet 1
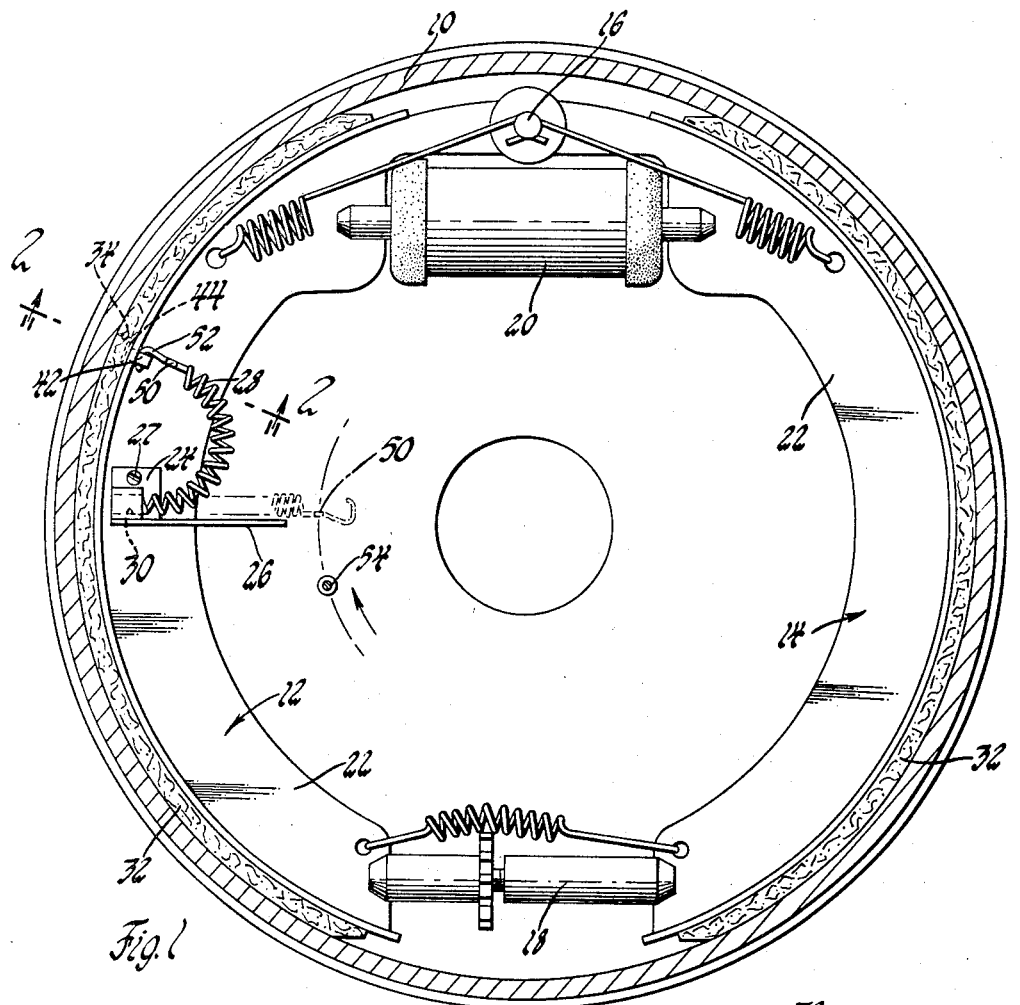
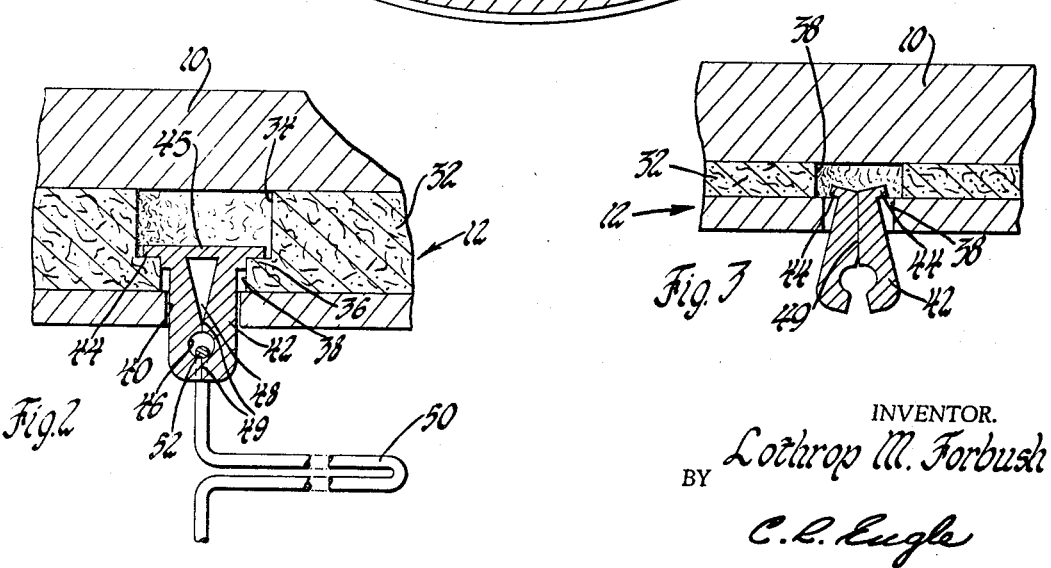
INVENTOR.
Lothrop M. Forbush
BY
C. L. Engle
ATTORNEY May 28, 1968            L. M. FORBUSH            3,385,256
VEHICLE BRAKE LINING WEAR INDICATING DEVICES
Filed Feb. 28, 1967                         2 Sheets-Sheet 2
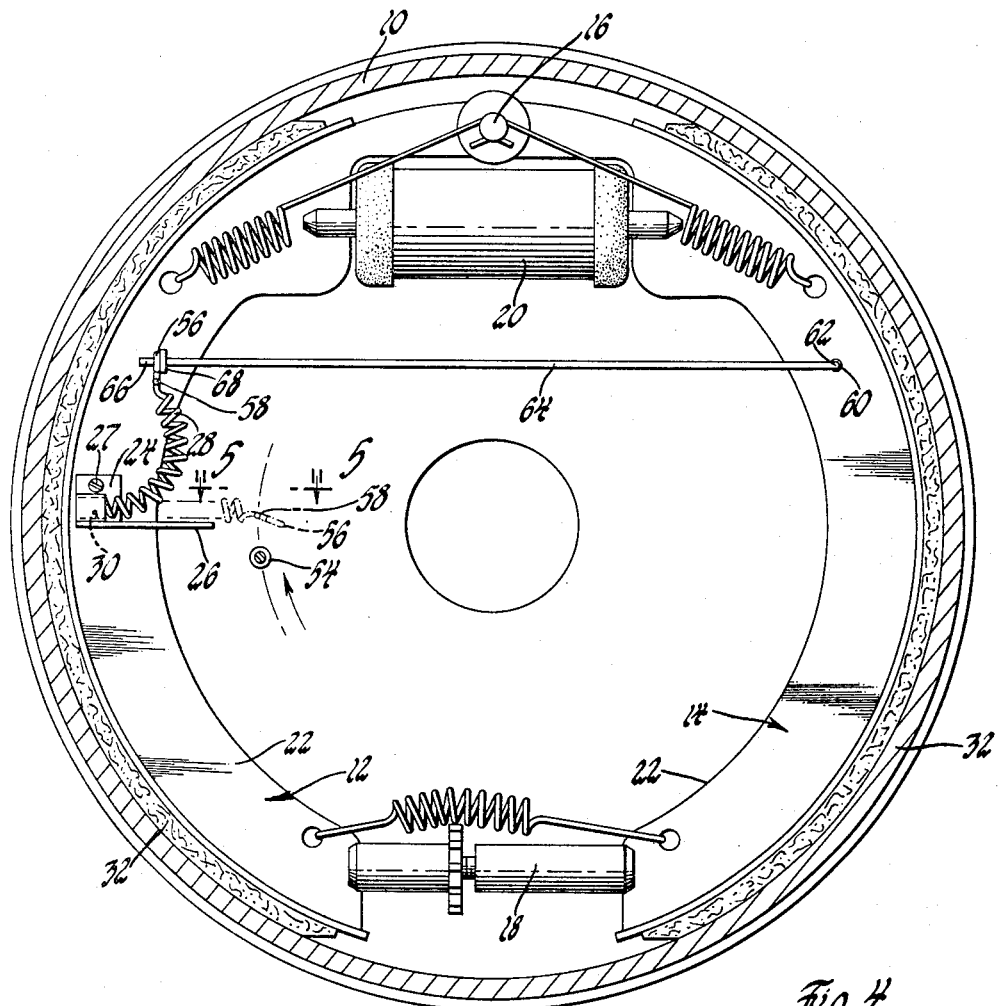
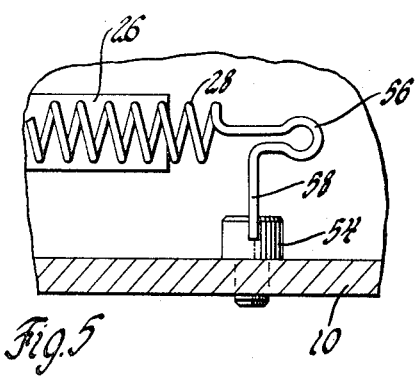
INVENTOR.
Lothrop M. Forbush
BY
C. L. Engle
ATTORNEY United States Patent Office 3,385,256
Patented May 28, 1968

3,385,256
VEHICLE BRAKE LINING WEAR
INDICATING DEVICES
Lothrop M. Forbush, Birmingham, Mich., assignor to
General Motors Corporation, Detroit, Mich., a corporation of Delaware
Filed Feb. 28, 1967, Ser. No. 619,421
Filed 6 Claims. (Cl. 116—67)

ABSTRACT OF THE DISCLOSURE

This disclosure describes vehicle brake lining wear indicating devices wherein the occurrence of sufficient lining wear releases a resilient member from an inoperative position so that it can assume an operative position and provide an audible signal to the vehicle operator. The resilient member comprises a spring that has one end adjacent a sound producing member. Sufficient lining wear causes a trigger member to release the spring for engagement by a cam member on the vehicle wheel so that the released end of the spring will strike the sound producing member and provide an audible signal as the wheel rotates.

At the present time, it is common practice in this art to either embed a wear responsive and signalling member within the brake lining or associate such a member with the lining in a manner requiring substantial modification of conventional parts. The purpose of this invention is to provide a simple signal arrangement that requires slight modification of conventional brake shoes to provide a reliable and economical system. More specifically, assembly of this system merely requires the drilling of a counter hole through the lining and another hole through the shoe, or a hole through the web of a conventional brake shoe assembly and the fastening of a small subassembly of parts to the brake shoe in addition to the fastening of a cam member to the associated vehicle wheel.

Therefore, among the objects of this invention is the provision of a simple mechanical audible indicating device that can be readily attached to a conventional brake shoe.

Another object of this invention is the provision of an audible indicating device wherein a signal producing member is secured in an inoperative position by a trigger member that is responsive to brake lining wear.

A further object of this invention is the provision of a brake lining wear indicating mechanism wherein the signal producing member is secured in an inoperative position by a trigger or release member that is secured to the brake lining at the point of most wear.

A still further object of this invention includes the retaining of a signal producing member in an inoperative position in a wheel assembly by a trigger member that is responsive to wear of both brake shoe linings.

Another object of this invention is the provision of a trigger member made of a soft erodible material that contacts the brake drum and wears away to release a signal producing member so that it can move to an operative position when sufficient brake lining wear occurs.

Yet another object of this invention is the provision of a brake lining wear indicating device which compensates for stack-up tolerances in the brake wheel assembly.

Further objects and advantages of the invention will be apparent from the following description, reference being made to the accompanying drawings wherein preferred embodiments of the invention are shown for illustrative purposes.

In the drawings:

FIGURE 1 is a view partly in section and partly in elevation of a typical vehicle wheel illustrating one embodiment of the invention.

FIGURE 2 is a cross-sectional view taken on lines 2—2 in FIGURE 1.

FIGURE 3 is a cross-sectional view showing the parts of FIGURE 2 in a worn condition.

FIGURE 4 is a view partly in section and partly in elevation of a vehicle wheel illustrating a modified embodiment of the invention.

FIGURE 5 is a cross-sectional view taken on lines 5—5 of FIGURE 4.

Referring now to the drawings, a wheel drum 10 incorporating one embodiment of this invention is shown in FIGURE 1 and contains conventional brake shoes 12 and 14 which are secured at one end to an anchor pin 16 and are connected at their other ends to a conventional automatic adjusting mechanism 18. An hydraulic actuated cylinder and piston asembly 20 is placed adjacent anchor pin 16 to actuate the shoes 12 and 14 to engage wheel drum 10 during application of the brakes. The brake shoes 12 and 14 include webs 2, one of which has a bracket 24 including a clapper, or sound producing plate member, 26 secured thereto by a bolt 27. One end of a coil spring 28 is inserted into a recess 30 of the bracket 24 and is fixedly retained therein by a frictional force fit or by other conventional means. The brake shoes 12 and 14 have linings 32 secured to their outer surfaces and one of these linings contains a counter bore 34. The counter bore 34 includes a bottom shoulder 36 and a smaller bore 38 is in axial alignment with a bore 40 in the brake shoe as best shown in FIGURE 2. A trigger pin 42 of a soft metal or like material is disposed within the counter bore 34 and comprises flanges 44 which engage the shoulder 36. The trigger pin 42 contains a lateral aperture 46 and can be of a hollow construction to include cut-out areas or apertures 48 for a purpose which will be described later. The pin 42 is also split longitudinally as shown by numeral 49.

The spring, or resilient member, 28 includes a laterally projecting portion 50 and a hooked end portion 52 which is inserted within aperture 46 of the pin 42 so that the spring member is normally retained in a curved retracted position as shown in FIGURE 1. The wheel drum 10 has a cam member 54 attached thereto in a predetermined position relative to the lateral projection 50 of spring 28.

From the above description, it is apparent that a conventional brake shoe such as shoe 12 including lining 32 is easily machined to provide the stepped bore arrangement including bore 34, shoulder 36, bore 38 and hole 40 through the shoe. The bracket 24 is attached to web portion 22 by the bolt 27 and one end of spring 28 is inserted and frictionally retained within recess 30. The trigger pin 42 is placed within bores 34 and 38, and extends through hole 40. The pin 42 is necessarily composed of a soft material such as aluminum or the like which will readily wear away when engaged by the drum 10. To complete the assembly, the hooked end portion 52 of spring 28 is inserted within aperture 46 of the pin to hold the spring 28 in a retracted inoperative position. Therefore, when sufficient brake lining wear occurs, the upper portions of pin 42 including flange 44 and lateral web 45 will be worn away by frictional rubbing contact with the inner surface of drum 10, and the pin will collapse to the position shown in FIGURE 3, the cutout areas 48 being positioned in the pin to facilitate such collapsing. More specifically, in a prefered embodiment the triangular aperture 48 can be configured to take advantage of the tension of spring 28 whereby upon sufficient erosion of flange 44 the pin 42 is caused to pivot on its longitudinal split line 49 to the collapsed open spring releasing position. As shown in FIGURE 3 the separated half sections of the pin 42 pivot in a hinging fashion at the apex of the triangular position to close the aperture 48 so that the spring is released from aperture 46. Spring end 52 will then be released and the spring 28 will asume an extended operative position so that lateral projection 50 lies in the path of cam 54 as shown in FIGURE 1. When this condition occurs rotation of the wheel drum causes cam 54 to engage the lateral portion 50 of spring 28 during each revolution of the wheel and flex the spring against the sounding plate 26 to provide a signal audible to the vehicle operator.

When new linings are installed, the counter bores 34 and 38 are machined in the lining 32 and if a new brake shoe 12 is used, the hole 40 is drilled and a tapped hole is provided to receive bolt 27. A new pin 42 is inserted in the aligned holes and spring end 52 is again placed in pin aperture 46 to secure spring 28 in a retracted position until released by the wearing away and subsequent fracture of pin 42.

It is significant that the structure of this invention allows the pin 42 to be placed at the point where the most wear in the brake lining 32 is likely to occur. Past experience has indicated that brake linings do not wear in an even fashion and that it is common for the lining to wear through to the brake shoe at one point prior to a like amount of lining wear along the rest of the shoe. In fact, the rate of wear is usually higher at the upper portion of the secondary shoe of a wheel assembly, and where this situation prevails the pin 42 can readily be placed in this area.

A modified embodiment of the invention is shown in FIGURE 4 wherein like numerals refer to like parts of FIGURE 1. The brake shoe 12 has bracket 24 secured to web 22 by means of bolt 27 and one end of a modified spring 28 is frictionally retained within recess 30 of the bracket. The spring 28 is bent in the form of a loop or fastening eye 56 at its free end and terminates in lateral extension 58, as best shown in FIGURE 5. Web 22 of brake shoe 14 is drilled to contain aperture 60 which receives a bent end 62 of release, or trigger, rod 64. The other end 66 of rod 64 slidably engages an eye, or guide, member 68 attached to brake shoe 12.

As best shown in FIGURE 4, the spring 28 is held in a curved position as fastening eye 56 is placed upon rod end 66 adjacent rod guide 68. As the linings 22 wear, brake shoes 12 and 14 move away from each other and the distance between aperture 60 and rod guide 68 increases until a sufficient amount of wear causes rod 64 to move out of spring eye 56 allowing the spring 28 to assume an extended position adjacent sounding plate 26. Rotation of wheel drum 10 will then cause cam 54 to engage lateral extension 58 of the spring and click it against the sounding plate and create a signal to the vehicle operator during each revolution of the wheel. The rod 64 can be of any predetermined length to release spring 28 at any stage of lining wear and at the same time compensate for assembly stack-up tolerances that may be present in the wheel assembly.

From the above description, it is apparent that after new or reconditioned brake shoes have been installed, the rod end 66 is placed in rod guide 68 and end 62 is inserted in aperture 60. The spring eye 56 is then again positioned on rod end 66 to hold the spring 28 in a retracted position until sufficient lining wear is developed.

While preferred structures of the subject invention have been described, it is apparent that the pin 42 could assume numerous configurations, the only limitation being that it must be comprised of a suitable material to wear away and release the spring member 28 without damaging the wheel drum 10 when a surface of the pin comes into contact with the drum. The rod 64 in the embodiment of FIGURES 4 and 5 provides a means for compensating for tolerances related to the movement of both brake shoes in the brake assembly. This compensation is desirable as a more accurate indication of lining wear is provided.

The above description is not intended to limit the scope of this invention except as required by the appended claims.

I claim:

1. A brake lining wear indicating device for a wheel brake assembly having a drum and a brake shoe with a brake lining thereon engageable with the drum comprising a resilient member having one end attached to a brake shoe and the other end movable between retracted and extended positions, a sounding plate mounted on the brake shoe adjacent the extended position of said resilient member, a cam member attached to the wheel drum, and trigger means responsive to brake lining wear being operatively connected to the other end of said resilient member for releasably retaining said resilient member in the retracted position, said trigger means releasing the other end of said resilient member upon the occurrence of a predetermined amount of brake lining wear whereby said resilient member automatically moves to its extended position juxtaposed to said sounding plate in the path of rotation of said cam member such that each revolution of the wheel drum causes said resilient member to strike said sounding plate.

2. A brake lining wear indicating device as described in claim 1 wherein said trigger means comprises a flanged pin of erodible material carried by the brake shoe and engageable with the drum such that a portion of said pin is worn away by the drum when sufficient brake lining wear occurs to release said resilient member.

3. A brake lining wear indicating device as described in claim 1 where said resilient member comprises a coil spring having a laterally extending projection which is engaged by said cam member.

4. A brake lining wear indicating device as described in claim 1 wherein said trigger means contains a laterally extending aperture and said resilient member comprises a coil spring having a hooked end which fits within said trigger means aperture to retain it in a retracted position.

5. A brake lining wear indicating device as described in claim 1 wherein said trigger means comprises a pin member having a flanged end and a shank portion, said shank portion being longitudinally split and having two laterally extending apertures therethrough, a hooked portion formed at the other end of said resilient member being releasably received in one of the pin apertures, the other pin aperture being of triangular cross section with its base being positioned adjacent said flanged end whereby wearing away of the pin flange in combination with tension supplied by said resilient member causes hinging movement of said pin at the apex of the triangular aperture to a collapsed open position releasing said resilient member to its extended sound producing position.

6. A brake lining wear indicating device for a wheel brake assembly having a drum and a pair of brake shoes with brake lining thereon engageable with the drum comprising a resilient member having one end attached to a first of the brake shoes, the other end of said resilient member having a looped portion thereon and being movable between retracted and extended positions, a sounding plate mounted on the first brake shoe juxtaposed to said resilient member in its extended position, a cam member attached to the wheel drum in a position to engage and strike the other resilient member end against said sounding plate when in its extended position, a trigger rod member having one end pivotally secured to a second of the brake shoes and being of sufficient length to extend laterally across the wheel drum and present its free end in overlying relationship with a portion of the first brake shoe, and a guide member secured to the first brake shoe, the free end of said trigger rod being slidably supported by said guide member and having an extended portion therebeyond, the looped portion of said resilient member being releasably supported on said extended rod portion whereby sufficient wear of the linings on both the first and second brake shoes moves said trigger rod in said guide member to release said resilient member to its extended position in the rotating path of said cam member.

References Cited

UNITED STATES PATENTS 3,282,241 11/1966 Forbush _____ 116—67
3,320,921 5/1967 Wolf et al. _____ 116—67

LOUIS J. CAPOZI, *Primary Examiner.*